United States Patent
Justen

(10) Patent No.: US 7,149,890 B2
(45) Date of Patent: Dec. 12, 2006

(54) INITIALIZING SYSTEM MEMORY

(75) Inventor: Jordan L. Justen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 489 days.

(21) Appl. No.: 10/719,801

(22) Filed: Nov. 21, 2003

(65) Prior Publication Data

US 2005/0114620 A1  May 26, 2005

(51) Int. Cl.
G06F 15/177 (2006.01)
G06F 9/445 (2006.01)

(52) U.S. Cl. .............. 713/2; 713/1; 713/100; 711/100; 711/170; 711/202; 711/206

(58) Field of Classification Search ............ 713/1, 713/2, 100; 711/100, 202, 170, 206
See application file for complete search history.

(56) References Cited

U.S. PATENT DOCUMENTS

| | | | | |
|---|---|---|---|---|
| 5,606,660 A | | 2/1997 | Estakhri | |
| 5,796,996 A | * | 8/1998 | Temma et al. | 712/225 |
| 6,058,474 A | * | 5/2000 | Baltz et al. | 713/1 |
| 6,148,370 A | * | 11/2000 | Kobayashi | 711/118 |
| 6,473,853 B1 | | 10/2002 | Spiegel et al. | |
| 6,601,167 B1 | * | 7/2003 | Gibson et al. | 713/2 |
| 6,606,686 B1 | * | 8/2003 | Agarwala et al. | 711/129 |
| 6,678,790 B1 | * | 1/2004 | Kumar | 711/118 |
| 6,711,059 B1 | * | 3/2004 | Sinclair et al. | 365/185.11 |
| 6,711,675 B1 | * | 3/2004 | Spiegel et al. | 713/2 |
| 6,748,527 B1 | * | 6/2004 | Utsumi et al. | 713/2 |
| 2003/0233533 A1 | * | 12/2003 | Avraham | 713/1 |
| 2004/0098575 A1 | * | 5/2004 | Datta et al. | 713/2 |
| 2005/0213377 A1 | * | 9/2005 | Shoff et al. | 365/185.2 |

* cited by examiner

Primary Examiner—Lynne H. Browne
Assistant Examiner—Nitin C. Patel
(74) Attorney, Agent, or Firm—Fish & Richardson P.C.

(57) ABSTRACT

Systems and techniques described herein may include both memory mapped and non-memory mapped firmware. A memory region may be in communication with at least one of the memory mapped non-volatile memory region. The memory region may be a cache memory region, and a paging mechanism may be implemented in at least a portion of the cache memory.

36 Claims, 2 Drawing Sheets

INITIALIZING SYSTEM MEMORY

BACKGROUND

When a computer or other data processing system is first booted up, the operating system is not available to provide instructions for system operation. In the time interval between power on and operating system start up, firmware provides instructions to initialize the system.

System firmware includes instructions necessary to load portions of the operating system from a storage medium such as a hard disk into the system memory, as well as other instructions and data for initializing system components such as the main memory. Firmware is stored in a non-volatile medium such as flash memory. Flash memory is programmable non-volatile memory (i.e. it retains the stored information when the system is powered down but may be reprogrammed if desired).

System firmware is typically memory mapped. That is, a flash memory (or other) chip storing the firmware includes a hardware mechanism so that the instructions and data included in the firmware can be accessed via a standard processor memory read. Devices that are directly readable by the processor (memory mapped) are generally more expensive than devices which are not memory mapped.

DESCRIPTION OF DRAWINGS

Like reference symbols in the various drawings indicate like elements.

DETAILED DESCRIPTION

Systems and techniques described herein may provide for more cost efficient data processing systems utilizing both memory mapped and non-memory mapped firmware. Additionally, the efficiency of a startup process may be improved by implementing a paging mechanism in at least a portion of system cache memory that is configured to function as RAM during system startup.

In some existing computer systems, the microprocessor uses cache memory to enhance performance. Rather than accessing the system memory each time it needs information, the microprocessor may initially access the system memory to retrieve data or instructions, then store the data or instructions in the cache memory for future use. Since it is statistically more likely that the same information is repeatedly accessed, storing the information locally in a fast memory may provide a significant advantage.

Cache memory, which may be integrated with a processor or separate from the processor, is used as a performance enhancing feature during regular system operation. However, it has been recognized that system cache may be used prior to initialization of the main memory to enable more efficient system start up. Moreover, since the cache would ordinarily be unused during system startup, using system cache may allow the additional efficiency to be obtained without the cost or complexity of additional memory. Although implementations of the current systems and techniques utilize the cache memory, other implementations are possible (e.g., different and/or additional memory may be used).

Figure 1:
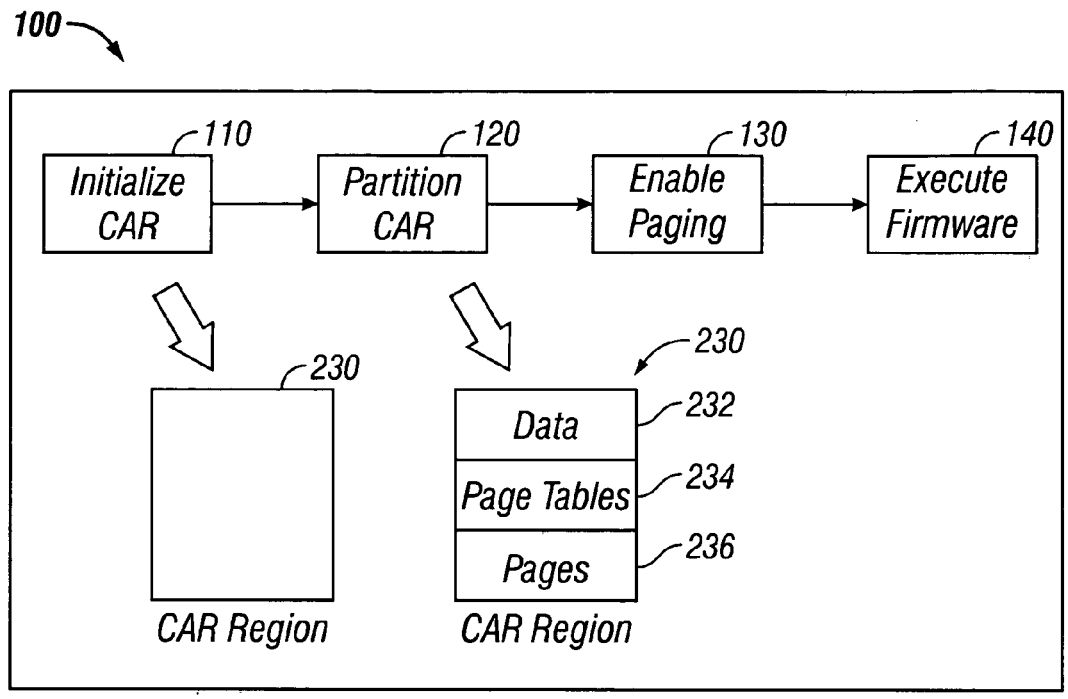
FIG. 1 shows an implementation of a method for enabling the use of cache memory as RAM during system startup.

FIG. 1 shows a method 100 in which system cache is used to enable more efficient startup. The cache may first be initialized so that system firmware has the ability to use the cache (in a small region of the system memory map) as readable and writeable memory (110). This process may be referred to as initializing the cache as RAM (CAR) state. The initialization process may include requesting data for a range of memory addresses, which may not correspond to actual memory in the system. In response to these requests, the system may be configured so that placeholder data is returned (so that the processor will not hang). Once data has been returned for a range of addresses to be used for the cache, subsequent reading of the data corresponding to that address range will be from the cache rather than from other parts of the system.

The cache may then be partitioned (120). For example, the cache may be partitioned to a region for data, a region for pages, and (optionally) a region for page tables. In implementations using software-managed translation lookaside buffer (TLB), page tables may be omitted. Paging may then be enabled in the processor (130), and the firmware may be executed (140).

Figure 2:
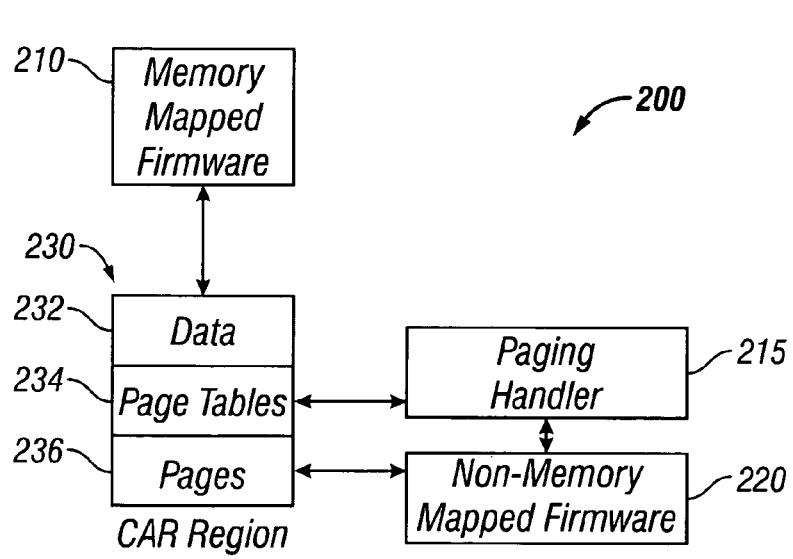
FIG. 2 is a schematic of a system including memory mapped and non-memory mapped firmware, according to some implementations.

As noted above, firmware provides data and instructions to be used prior to execution of the operating system. In existing systems, firmware is typically memory mapped and includes the instructions necessary for system startup. Firmware execution according to current systems and techniques may be implemented using a system 200 as shown in FIG. 2 and a method shown in FIG. 3. System 200 includes firmware having two parts: memory mapped firmware 210, as well as non-memory mapped firmware 220. Memory mapped firmware 210 may be stored on a medium such as a flash memory chip including a hardware mechanism allowing direct reading by the processor. Memory mapped firmware is configured to initialize CAR and paging.

Non-memory mapped firmware 220 may be stored on a different medium, such as a different (e.g., less expensive) flash memory chip or hard drive. For non-memory mapped firmware 220, the hardware mechanism enabling direct processor access may be omitted. An important benefit of this approach is that the non-memory mapped firmware source may be cheaper, since the additional complex hardware associated with memory mapping may be omitted. Non-memory mapped firmware 220 is executed from a logical address space (e.g., pages in region 236 of CAR 230).

Figure 3:
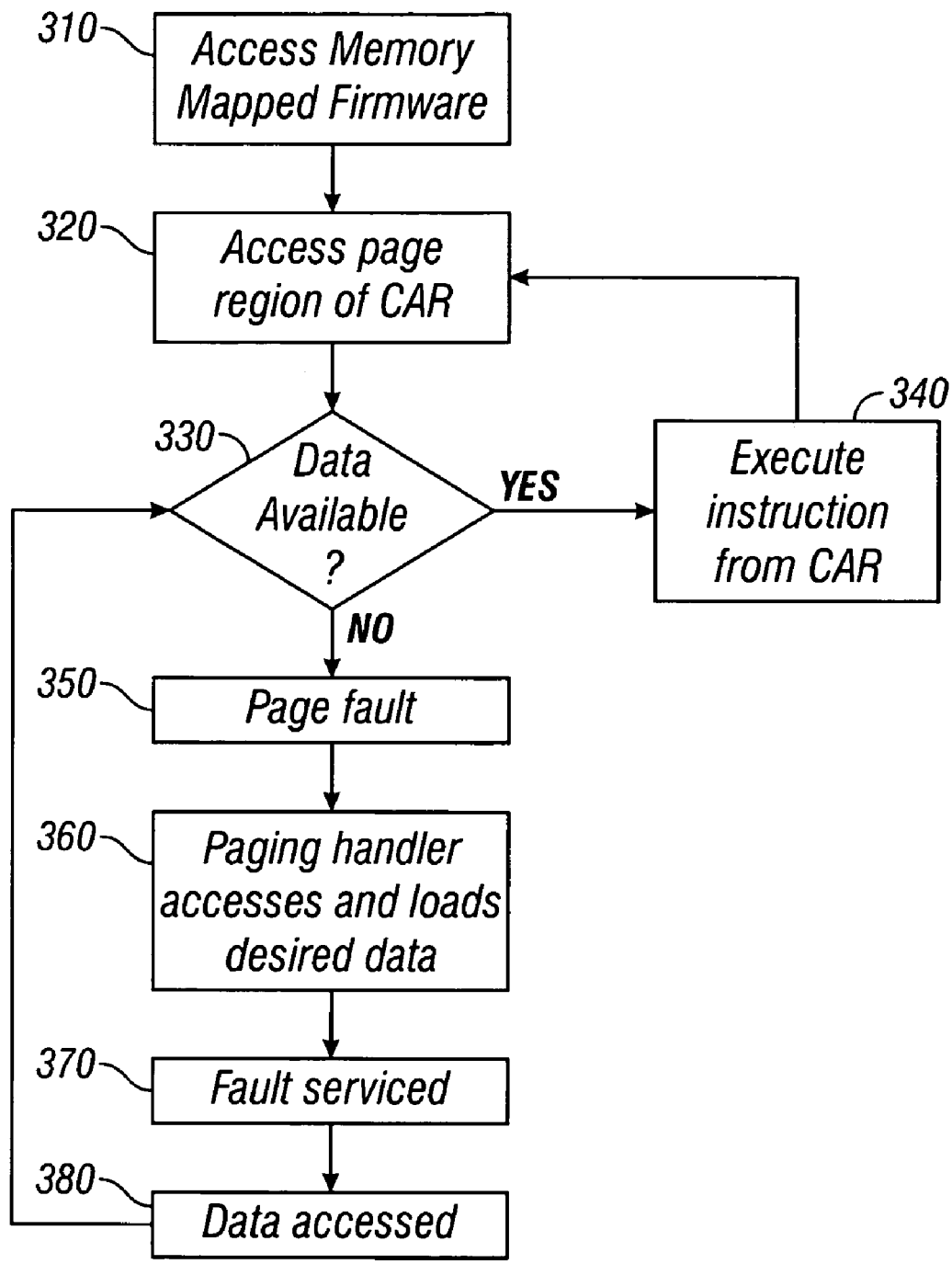
FIG. 3 shows an implementation of a method for executing system firmware.

System 200 includes a paging handler 215, which may reside on memory mapped firmware, or may be retrieved from non-memory mapped firmware 220 and put into a reserved portion of CAR 230 for use during the execution phase (see FIG. 3). Paging handler 215 utilizes and controls CAR region 230 to implement a paging mechanism. For example, CAR region 230 may be partitioned to include a data region 232, a page table region 234, and a page region 236. Page region 236 may be configured to store an appropriate number of pages. The minimum number of pages may be dependent on the nature of the instructions used by the processor, while the maximum number of pages may be dependent on the size of CAR region 230. For example, page region 236 may be configured to store at least three pages so that instructions on one page may be used to copy data between two other pages.

System 200 may be implemented in a number of ways. For example, system 200 may be implemented in an architecture in which a chipset is provided to support the microprocessor. Portions of system 200, such as memory mapped firmware 210 and/or non-memory mapped firmware 220 may be incorporated in a chipset separate from a microprocessor. System 200 may be included in a data processing system such as a computer or other data processing system. Of course, many configurations are possible.

FIG. 3 shows an implementation of a method 300 for executing system firmware. The microprocessor may first access the memory-mapped firmware (310). Although the memory-mapped firmware includes some of the instructions and data for initializing the system, other instructions and data are included in the non-memory mapped firmware.

For instructions and data included in the non-memory mapped firmware, the memory mapped firmware is directed to one or more pages of a CAR region or other memory region (320). If the desired data is available, the instruction is executed from the CAR region (330, 340). If the appropriate page (or pages) are not in the CAR region pages, a page fault processor exception is generated (330, 350). In response, a paging handler accesses the non-memory mapped firmware and loads the desired data into the CAR region (360). The paging handler then returns a fault serviced signal (370). The memory mapped firmware may then access the desired page(s) in the CAR region and execute the instruction (380). Portions of the process may repeat; for example, by checking to determine whether data is available (330) after accessing data. Further, after executing an instruction from the CAR (340), the page region of CAR may be accessed one or more additional times (320), and additional instructions may be executed.

The systems and techniques described above allow at least some instructions to be stored on non-memory mapped firmware. Since integrated circuits implementing non-memory mapped firmware need not include hardware for memory mapping, the firmware cost may be reduced. Additionally, enabling paging using a CAR region allows the firmware as a whole to execute as though it is running from a contiguous memory region, when instead it is running from a limited page set.

The systems and techniques may additionally provide for faster system startup. In existing systems, firmware is typically executed uncached rather than from fast cache memory. Using system cache as RAM may also ease the difficulty of programming system startup by providing a region of memory that can be used early in the start up process. In existing systems, a substantial useable memory region is not available until the main memory is initialized. Since memory initialization generally involves executing a complex set of instructions, usable memory may not be available for a significant period. With CAR, the main memory initialization may also make use of the readable and writable memory region.

Having useable memory available early in the start-up process may also allow more efficient firmware storage by allowing data compression to be used. For example, the non-memory mapped firmware described above may include instructions or data which is compressed. The paging handler may include a decompression algorithm. The instructions may be efficiently stored using a compression algorithm. In response to a page fault exception for the firmware instructions, the paging handler may implement a decompression algorithm to decompress the instructions into the CAR page. When the page fault handler completes, the decompressed instructions may subsequently be executed.

A number of implementations have been described. Nevertheless, it will be understood that various modifications may be made without departing from the spirit and scope of the invention. For example, firmware may be stored on other types of memory than those discussed here. For example, at least some non-memory mapped firmware may be stored on a hard drive and brought to the CAR region using the paging mechanism. The paging mechanism may be implemented using a memory other than cache. Accordingly, other implementations are within the scope of the following

What is claimed is:

1. A data processing system comprising:
    a memory mapped non-volatile memory region including one or more memory mapped executable instructions to initialize the data processing system;
    a non-memory mapped non-volatile memory region, the non-memory mapped non-volatile memory region including one or more non-memory mapped executable instructions to initialize the data processing system; and
    a third memory region in communication with at least one of the memory mapped non-volatile memory region and the non-memory mapped non-volatile memory region.

2. The system of claim 1, wherein the memory mapped non-volatile memory region comprises a first integrated circuit including a hardware mechanism to enable access to the one or more executable instructions using a processor memory read.

3. The system of claim 2, wherein the non-memory mapped non-volatile memory region comprises a second integrated circuit separate from the first integrated circuit.

4. The system of claim 3, wherein the second integrated circuit does not include a hardware mechanism to enable access to the one or more non-memory mapped executable instructions using a processor memory read.

5. The system of claim 1, wherein at least one of the memory mapped non-volatile memory region and the non memory-mapped non-volatile memory region is implemented as flash memory.

6. The system of claim 1, wherein the third memory region comprises cache memory.

7. The system of claim 6, further including a microprocessor, and wherein the cache memory is integrated with the microprocessor.

8. The system of claim 6, wherein the cache memory is partitioned to include a first region to store data and a second region to store one or more pages.

9. The system of claim 8, wherein the cache memory is partitioned to further include a third region to store one or more page tables.

10. The data processing system of claim 1, further comprising a paging handler to access the non-memory mapped non-volatile memory region and load the non-memory mapped executable instructions into the memory region.

11. A method of initializing a computer system, comprising:
    (a) accessing memory mapped firmware using a processor memory read;
    (b) executing an initialization instruction included in the memory mapped firmware;
    (c) copying a page including a second initialization instruction from non-memory mapped firmware to a second memory region;
    (d) translating an address in the second initialization instruction to a physical address of the copied page in the second memory region; and
    (e) executing the second initialization instruction.

12. The method of claim 11, wherein actions (a) through (e) are performed prior to initializing a main memory of the computer system.

13. The method of claim 11, further comprising prior to (c), initializing at least a portion of a cache memory as random access memory.

14. The method of claim 11, further comprising prior to (c):
- (b)(1) attempting to access a desired page of data stored in the second memory region;
- (b)(2) receiving a page fault signal indicating that the desired page of data is not stored in the second memory region; and
- (b)(3) copying the desired page of data from non-memory mapped firmware to the second memory region.

15. The method of claim 14, further comprising receiving a fault serviced signal indicating that the desired of page of data is in the second memory region.

16. The method of claim 15, further comprising executing an instruction included in the desired page of data stored in the second memory region.

17. The method of claim 11, further comprising partitioning the second memory region to include a region for data and a region for pages.

18. The method of claim 17, further comprising partitioning the second memory region to include a region for page tables.

19. A chipset comprising:
- a memory mapped non-volatile memory region in including one or more memory mapped executable instructions to initialize the data processing system;
- a non-memory mapped non-volatile memory region, the non-memory mapped non-volatile memory region including one or more non-memory mapped executable, instructions to initialize the data processing system; and
- a third memory region in communication with at least one of the memory mapped non-volatile memory region and the non-memory mapped non-volatile memory region.

20. The chipset of claim 19, wherein the memory mapped non-volatile memory region comprises a first integrated circuit included in the chipset, the first integrated circuit including a hardware mechanism to enable access to the one or more executable instructions using a processor memory read.

21. The chipset of claim 20, wherein the non-memory mapped non-volatile memory region comprises a second integrated circuit included in the chipset, the second integrated circuit separate from the first integrated circuit.

22. The chipset of claim 21, wherein the second integrated circuit does not include a hardware mechanism to enable access to the one or more non-memory mapped executable instructions using a processor memory read.

23. The chipset of claim 21, wherein at least one of the memory mapped non-volatile memory region and the non memory-mapped non-volatile memory region is implemented as flash memory.

24. The chipset of claim 19, wherein the chipset is in communication with a microprocessor.

25. The chipset of claim 19, wherein the third memory region comprises cache memory.

26. The chipset of claim 25, wherein the cache memory is configurable to be partitioned to include a first region to store data and a second region to store one or more pages.

27. The chipset of claim 26, wherein the cache memory is configurable to be partitioned to further include a third region to store one or more page tables.

28. The chipset of claim 19, further comprising a paging handler to implement a paging mechanism.

29. An article of manufacture comprising a machine accessible medium containing code having instructions that, when executed, cause the machine to:
- (a) access memory mapped firmware using a processor memory read;
- (b) execute an initialization instruction included in the memory mapped firmware;
- (c) copy a page including a second initialization instruction from non-memory mapped firmware to a second memory region;
- (d) translating an address in the second initialization instruction to a physical address of the copied page in the second memory region; and
- (e) execute the second initialization instruction.

30. The article of claim 29, wherein the instructions on machine accessible medium cause the machine to perform (a) through (e) prior to initializing a main memory of the computer system.

31. The article of claim 29, the instructions on machine accessible medium further causing the machine to initialize at least a portion of a cache memory as random access memory prior to (c).

32. The article of claim 29, the instructions on machine accessible medium further causing the machine to, prior to (c):
- (b)(1) attempt to access a desired page of data stored in the second memory region; and
- (b)(2) upon receiving a page fault signal indicating that the desired page of data is not stored in the second memory region, copy the desired page of data from non-memory mapped firmware to the second memory region.

33. The article of claim 32, the instructions on machine accessible medium further causing the machine to receive a fault serviced signal indicating that the desired of page of data is in the second memory region.

34. The article of claim 33, the instructions on machine accessible medium further causing the machine to execute a third instruction included in the desired page of data stored in the second memory region.

35. The article of claim 29, wherein the instructions on machine accessible medium cause the machine to partition the second memory region to include a region for data and a region for pages.

36. The article of claim 29, wherein the instructions on machine accessible medium cause the machine to partition the second memory region to include a region for page tables.

* * * * *